(12) United States Patent
Morein et al.

(10) Patent No.: US 6,975,325 B2
(45) Date of Patent: Dec. 13, 2005

(54) METHOD AND APPARATUS FOR GRAPHICS PROCESSING USING STATE AND SHADER MANAGEMENT

(75) Inventors: Stephen L. Morein, Cambridge, MA (US); Tom E. Frisinger, Hudson, MA (US); Philip J. Rogers, Pepperell, MA (US); Richard Bagley, Arlington, MA (US)

(73) Assignee: ATI Technologies Inc., Markham (CA)

( * ) Notice: Subject to any disclaimer, the term of this patent is extended or adjusted under 35 U.S.C. 154(b) by 0 days.

(21) Appl. No.: 10/763,782

(22) Filed: Jan. 23, 2004

(65) Prior Publication Data

US 2005/0162437 A1 Jul. 28, 2005

(51) Int. Cl.[7] .............................................. G09G 5/36
(52) U.S. Cl. ...................................... 345/557; 345/559
(58) Field of Search ................................ 345/501–506, 345/530, 426, 557, 559, 418, 522

(56) References Cited

U.S. PATENT DOCUMENTS 5,793,374 A * 8/1998 Guenter et al. ............. 345/426
6,268,875 B1 * 7/2001 Duluk et al. ................ 345/506
6,339,813 B1 * 1/2002 Smith et al. ................ 711/144
2004/0207622 A1 * 10/2004 Deering et al. ............. 345/426

* cited by examiner

Primary Examiner—Kee M. Tung

(74) Attorney, Agent, or Firm—Vedder, Price, Kaufman & Kammholz, P.C.

(57) ABSTRACT

A method and apparatus for graphics processing using state and shader management includes at least one state and shader cache coupled to a compiler for compiling a hardware state and shader vector from an abstract state vector. Also included is an abstract state vector register containing the abstract state vector that is provided to the state and shader cache and the compiler. The state and shader cache receives the abstract state vector and determines whether a cache entry for that abstract state vector already exists. If the cache entry exists, the hardware state and shader vector is provided to hardware. If the entry does not exist, the state and shader cache provides a miss signal to the compiler, whereupon the compiler compiles the abstract state vector and generates a hardware state and shader vector. Thereupon the hardware state and shader vector is provided to the hardware.

19 Claims, 5 Drawing Sheets

METHOD AND APPARATUS FOR GRAPHICS PROCESSING USING STATE AND SHADER MANAGEMENT

FIELD OF THE INVENTION

The invention relates generally to graphics processing and more particularly to the utilization of state and shader management in graphics processing.

BACKGROUND OF THE INVENTION

When processing graphics for visual display, prior to rendering the graphics, the system receives and must compile new vector inputs. This process can be a time consuming step, due to the amount of information which must be compiled. Once all of the input vector information is compiled, a hardware state and shader vector is created and then provided to a graphics processor. The graphics processor utilizes the state and shader vector to produce a visual output.

This graphics processing system can be extremely inefficient when a large input vector needs to be compiled and provided to the processor. Furthermore, to increase optimization for the best performance of the graphics processor, the compiler may require a long compile time to properly compile the large input vector.

In conventional processing systems, it is not uncommon to have the compiler recompiling commonly occurring large input vectors. Recompilation of the same input vector is redundant and wasteful.

FIG. 1 illustrates how a hardware state and shader vector 100 is generated by a compiler 102 in accordance with the prior art system. The compiler 102 receives an abstract state vector, shown generally at 104, which consists of an abstract render state 106, vertex shader programs 108, vertex shader constants 110, pixel shader programs 112 and pixel shader constants 114. The abstract state vector 104 is thereupon provided to the compiler 102 where the compiler compiles the input information, in accordance with well-known compiler techniques. Once the abstract state vector 104 has been compiled by the compiler 102, thereby generating a hardware state and shader vector 100, the hardware state and shader vector 100 is provided to a hardware 116, such as graphics processor or any other suitable hardware as recognized by one skilled in the art.

The compilation process illustrated in FIG. 1 must be executed for every hardware state and shader vector to be provided to the hardware. When the compiler 102 must recompile the abstract state vector 104, this creates an inefficient graphics pre-processing system. Therefore, there currently exists a need for an improved graphics processing unit using state and shader management of hardware state and shader vectors.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

The disclosed invention is an apparatus and method for graphics processing including providing an abstract state vector to a state and shader cache and determining if a cache entry exists within the state and shader cache for the abstract state vector, wherein the cache entry contains a hardware state and shader vector. If the cache entry exists, the hardware state and shader vector which is within the cache entry is provided to a graphics processor. Also, when the abstract state vector is provided to the state and shader cache, it is also provided to a compiler. Therefore, if the cache entry does not exist in the hardware state and shader vector, the compiler compiles the abstract state vector to thereupon produce the hardware state and shader vector. The state and shader cache generates a cache entry for the abstract state vector which was not contained therein and when the compiler has completed the compilation process, the hardware state and shader vector is written to the state and shader cache in the data entry having the abstract state vector. Thereupon, the state and shader cache provides the hardware state and shader vector to the graphics processor.

The abstract state vector is comprised of a vertex shader intermediate form, vertex shader constants, pixel shader intermediate form, pixel shader constants, and abstract render state. The cache entry within the state and shader cache is comprised of the abstract state vector and the hardware state and shader vector.

Figure 1:
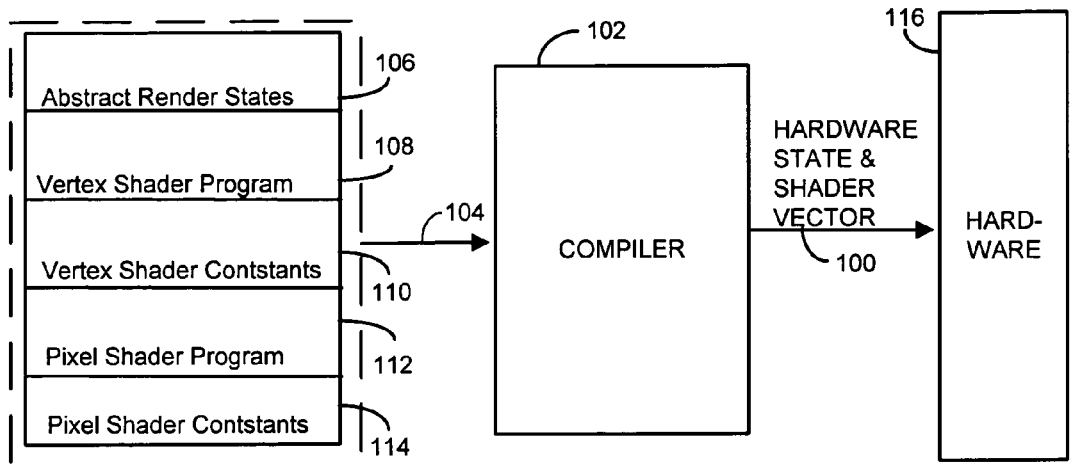
FIG. 1 is a block diagram of a prior art graphics processing system.
Figure 2:
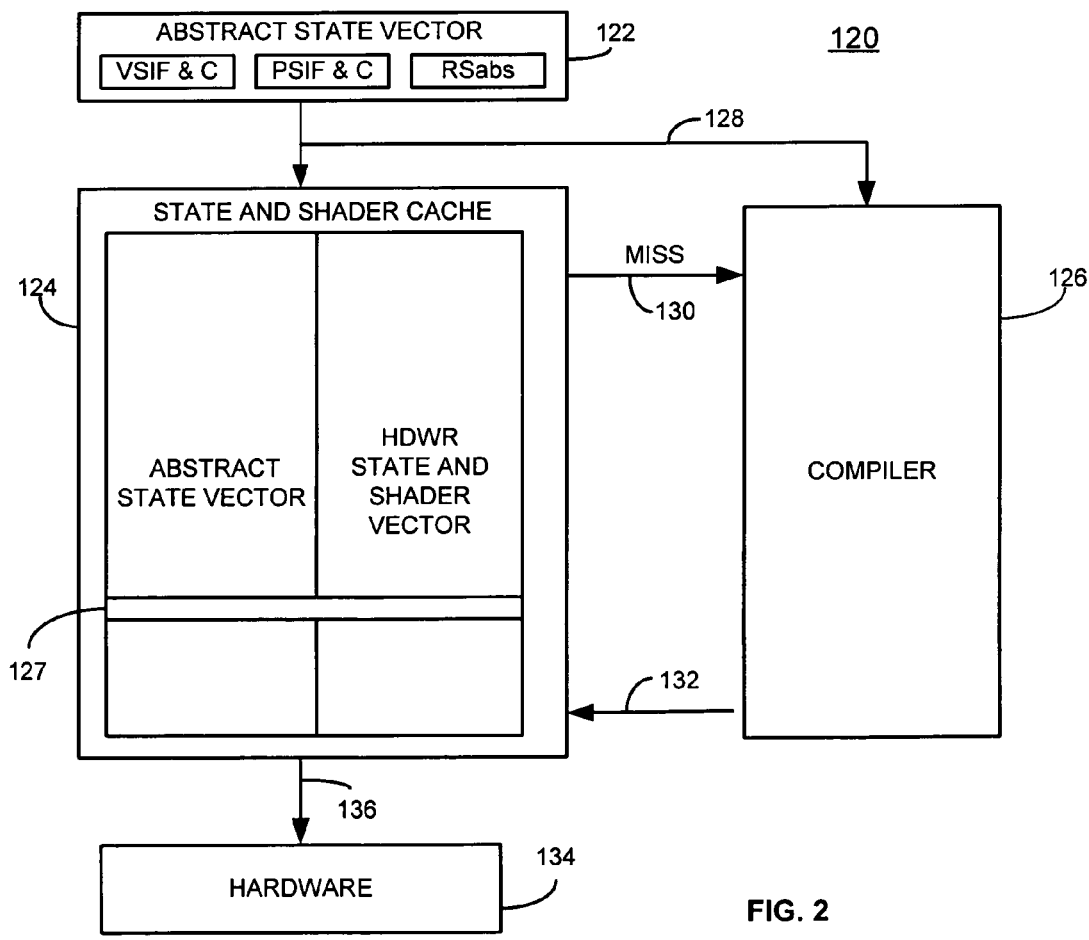
FIG. 2 is a block diagram of a graphics processing system using state and shader management in accordance with one embodiment of the present invention.

FIG. 2 illustrates a graphic processor using state and shader management in accordance with one embodiment of the present invention. The processing system 120 uses a data register 122 to hold an abstract state vector. As recognized by one skilled in the art, the abstract state vector may be provided directly from another application or other source, but has been illustrated in a data register for clarity purposes only. The processing system 120 further contains a state and shader cache 124 and a compiler 126. The state and shader cache 124 contains a plurality of cache entries, such as 127, which contain an abstract state vector and a hardware state and shader vector.

The abstract state vector 122 is provided to the state and shader cache 124 and the compiler 126 via connection 128. The state and shader cache 124 is further operably coupled with the compiler 126 via connection 130, wherein the state and shader cache 124 can provide the compiler 126 an indication when a miss has occurred. Furthermore, the compiler 126 is coupled to the state and shader cache 124 via connection 132, whereupon the compiler 126 can provide the compilation output to the state and shader cache 124. The state and shader cache 124 is further operably coupled to a hardware 134 via connection 136, wherein the state and shader cache 124 provides the hardware state and shader vector to the hardware 134. In one embodiment, the hardware may be a graphics processor 134 or any other suitable hardware device capable of recognizing or transferring the hardware state and shader vector.

Figure 3:
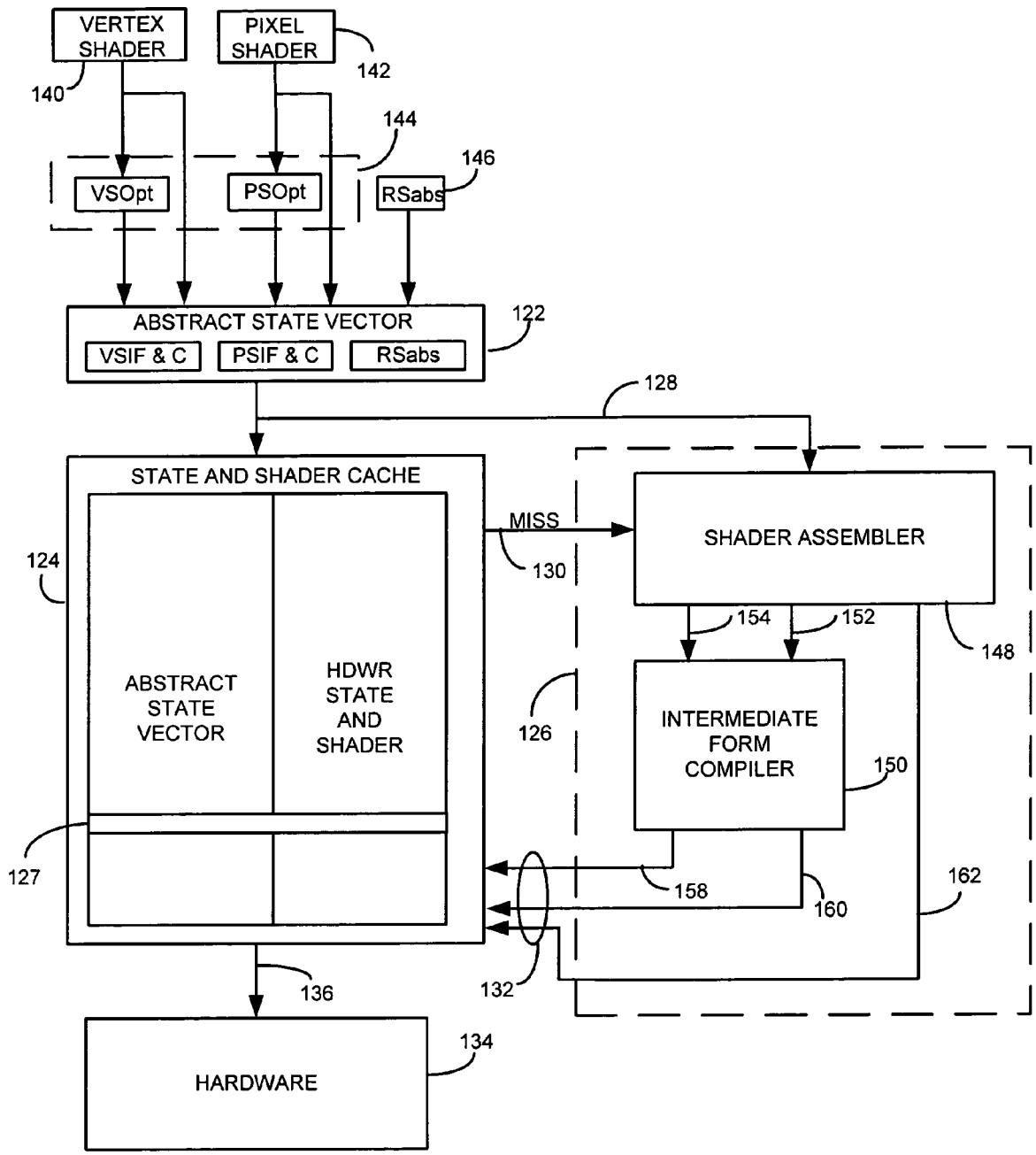
FIG. 3 is a block diagram of a graphics processing system using state and shader management in accordance with one embodiment of the present invention.

FIG. 3 illustrates the graphics processor 120 of FIG. 2 providing a greater level of detail regarding the compiler 126 and where the abstract state vector, stored in the register 122, is derived. In graphics processing, the flow of input data is provided into the compiler to be provided to the hardware, where the input contains specific vertex and pixel information. Vertex shader information 140 is provided into the compiler and so is pixel shader 142 information. In one embodiment, this shader information is processed not only directly into the compiler, but also through an optimizer 144. Whereupon, in conjunction with abstract render state 146, the abstract state vector is a compilation of a vertex shader intermediate form, which is the output of the vertex shader optimization, and vertex shader constants which were not a part of the optimization, and pixel shader intermediate form, the output of the pixel shader optimization, and pixel shader constants. Thereupon, the abstract state vector contained within the register 122 contains a vertex shader intermediate form, vertex shader constants, pixel shader intermediate form, pixel shader constants, and abstract render state. The compiler 126 utilizes all of this information to assemble and compile the hardware state and shader vector which is thereupon provided to the hardware 134.

Also illustrated in FIG. 3, the compiler 126 is further comprised of a shader assembler 148 and a compiler 150. The shader assembler receives the abstract state vector whereupon an intermediate form for the vertex shader and an intermediate form for the pixel shader is created by combining the input intermediate forms with the abstract render state. As illustrated in FIG. 3, the new vertex shader intermediate form created by the shader assembler 148 is provided to the compiler 150 via connection 152 and the new pixel shader intermediate form created by the shader assembler 148 is provided to the compiler 150 via connection 154. The compiler 150 thereupon executes the compilation in accordance with well-known techniques and thereby generates a vertex shader for the hardware 158 and a pixel shader for the hardware 160. The shader assembler 148 further provides a plurality of register writes 162. As illustrated in FIG. 2, the compiler 126 provides the compiler 150 and shader assembler 162 output to the state and shader cache 124 via connection 132. Thereupon, the state and shader cache 124 can provide the hardware state and shader vector to the hardware 134 via the connection 136.

Figure 4:
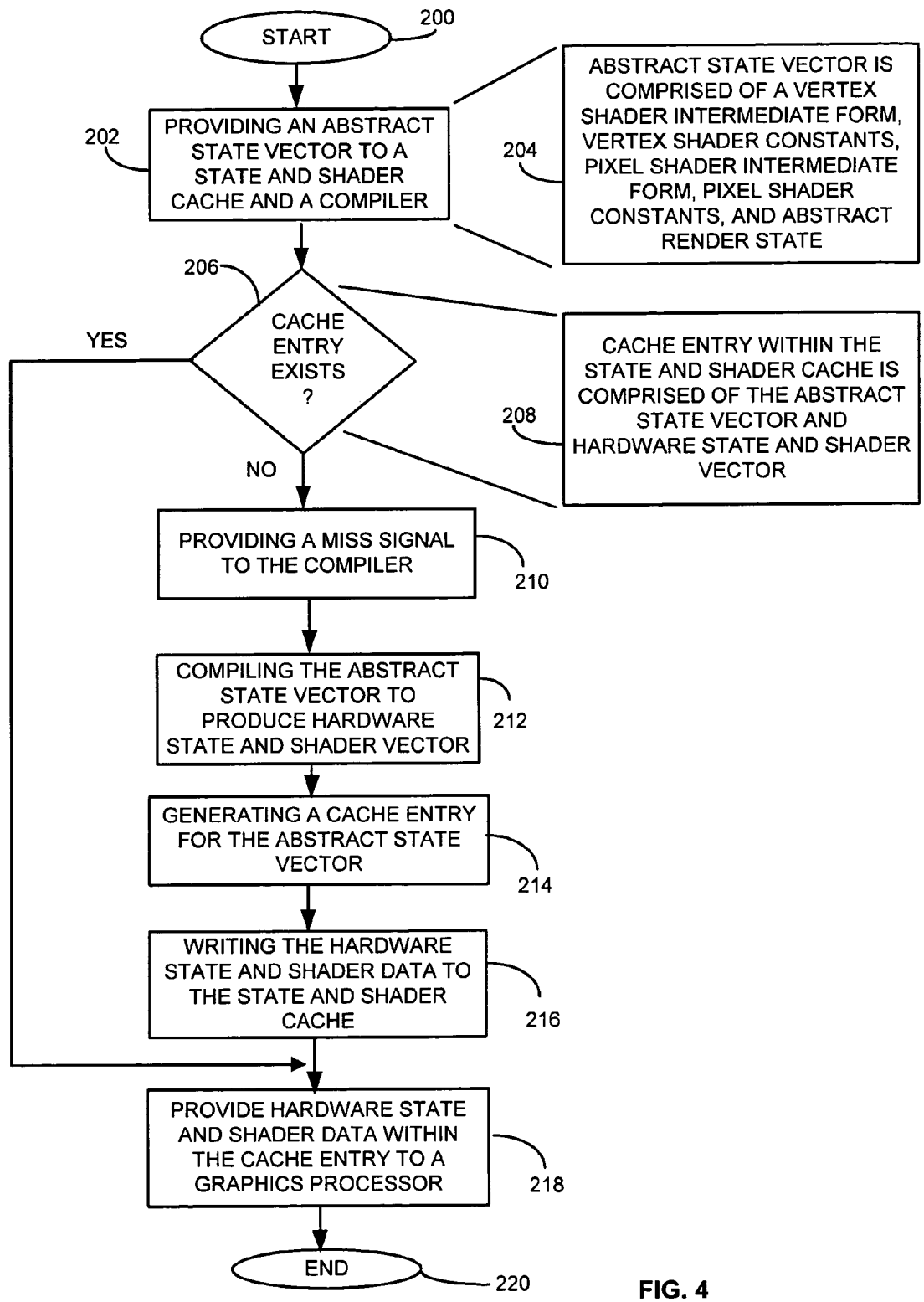
FIG. 4 is a flowchart illustrating a method for graphics processing using state and shader management in accordance with one embodiment of the present invention.

FIG. 4 illustrates the steps of state and shader management in graphics processing in accordance with one embodiment of the present invention, more specifically, in accordance with the system illustrated in FIGS. 2 and 3. The process begins, step 200, by providing an abstract state vector to the state and shader cache 124 and the compiler 126, shown at step 202. As discussed above and as illustrated in the register 122, the abstract state vector is comprised of a vertex shader intermediate form, vertex shader constants, pixel shader intermediate form, pixel shader constants, and abstract render state, shown at 204.

The next step, 206, is determining if a cache entry 127 exists within the state and shader cache 124 for the abstract state vector. As illustrated in FIGS. 2 and 3, the cache entry 127 within the state and shader cache 124 is comprised of the abstract state vector and the hardware state and shader vector, designated at 208. If the cache entry for the abstract state vector does not exist, the next step is providing a miss signal to the compiler, designated at 210. The miss signal is simply an indicator that the state and shader cache 124 does not contain the appropriate cache entry for the abstract state vector. The shader assembler 148 receives the miss signal and thereupon must compile the received abstract state vector. Therefore, the next step is compiling the abstract state vector to produce the hardware state and shader vector which is not currently stored in the state and shader cache 124, designated at step 212. The next step is generating a cache entry 127 for the abstract state vector within the state and shader cache 124. Thereupon, when the compiler has completed the compilation process, the next step 216 is writing the hardware state and shader vector to the state and shader cache.

Once the cache entry 127 has been completed, the hardware state and shader data within the cache entry 127 is provided to a graphics processor, such as the hardware 134 shown generally in FIGS. 2 and 3, designated at step 218. Furthermore, looking back up at step 206 where the determination was made if the cache entry exists, should it be determined that a cache entry does in fact exist within the state and shader cache, step 218 is re-executed and the hardware state and shader vector is provided to the graphics processor.

Thereupon, the graphics processor of FIGS. 2 and 3, in accordance with the method in FIG. 4, illustrates efficient graphics processing through using state and shader management. When the compiler has already compiled the same abstract state vector, the state and shader cache simply provides the hardware state and shader vector to the hardware, instead of having to delay processing speed to recompile the abstract state vector.

Moreover, it is also important for the state and shader cache to quickly and efficiently determine whether or not the abstract state vector has already been compiled and there is a cache entry containing the hardware state and shader vector. In one embodiment, a sub-vector approach is utilized to quickly and efficiently compare received abstract state vectors and compare them with abstract state vectors stored in the state and shader cache.

Figure 5:
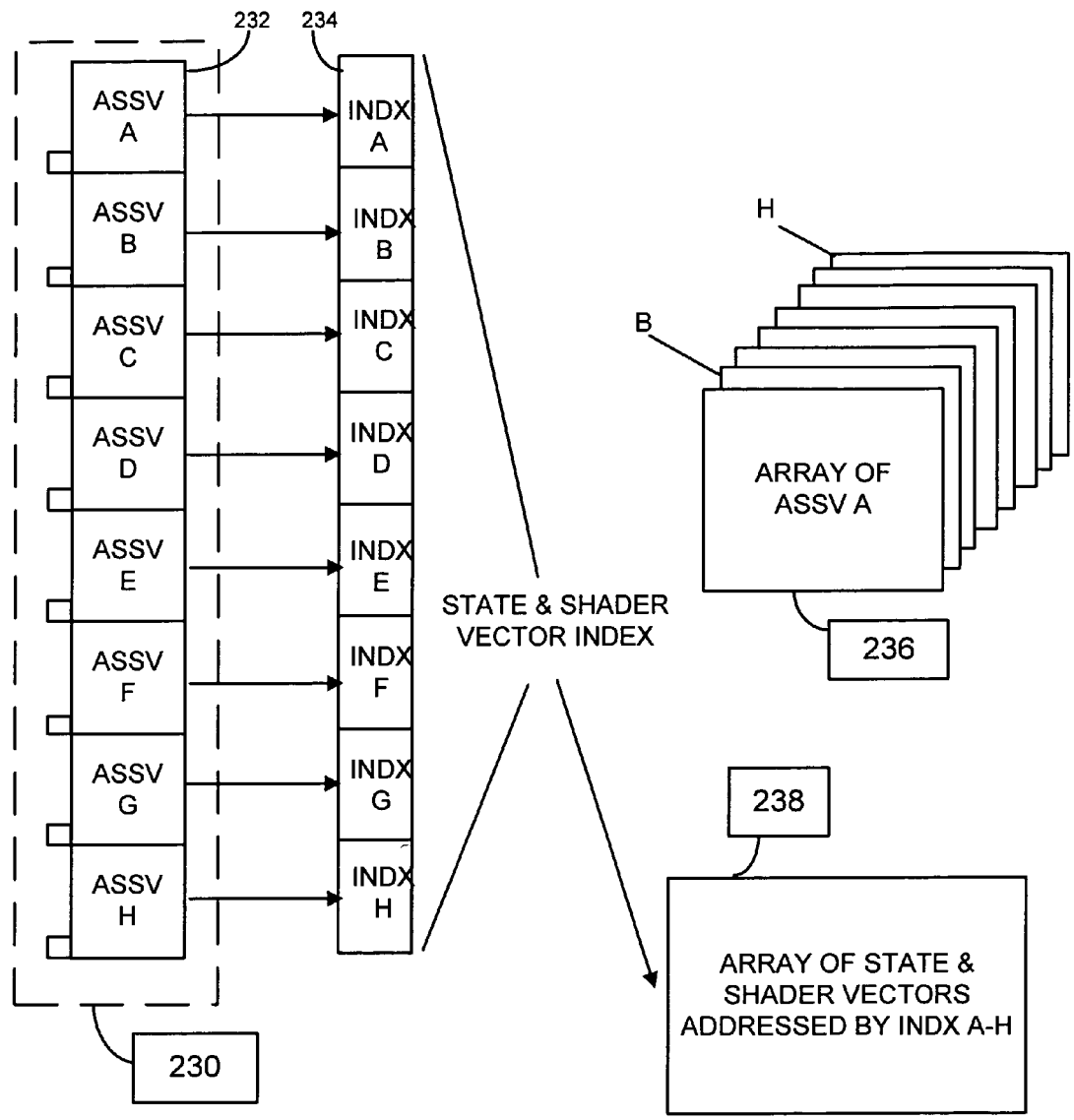
FIG. 5 is a graphical representation of an abstract state sub-vector and state and shader vector in accordance with one embodiment of the present invention.
Figure 6:
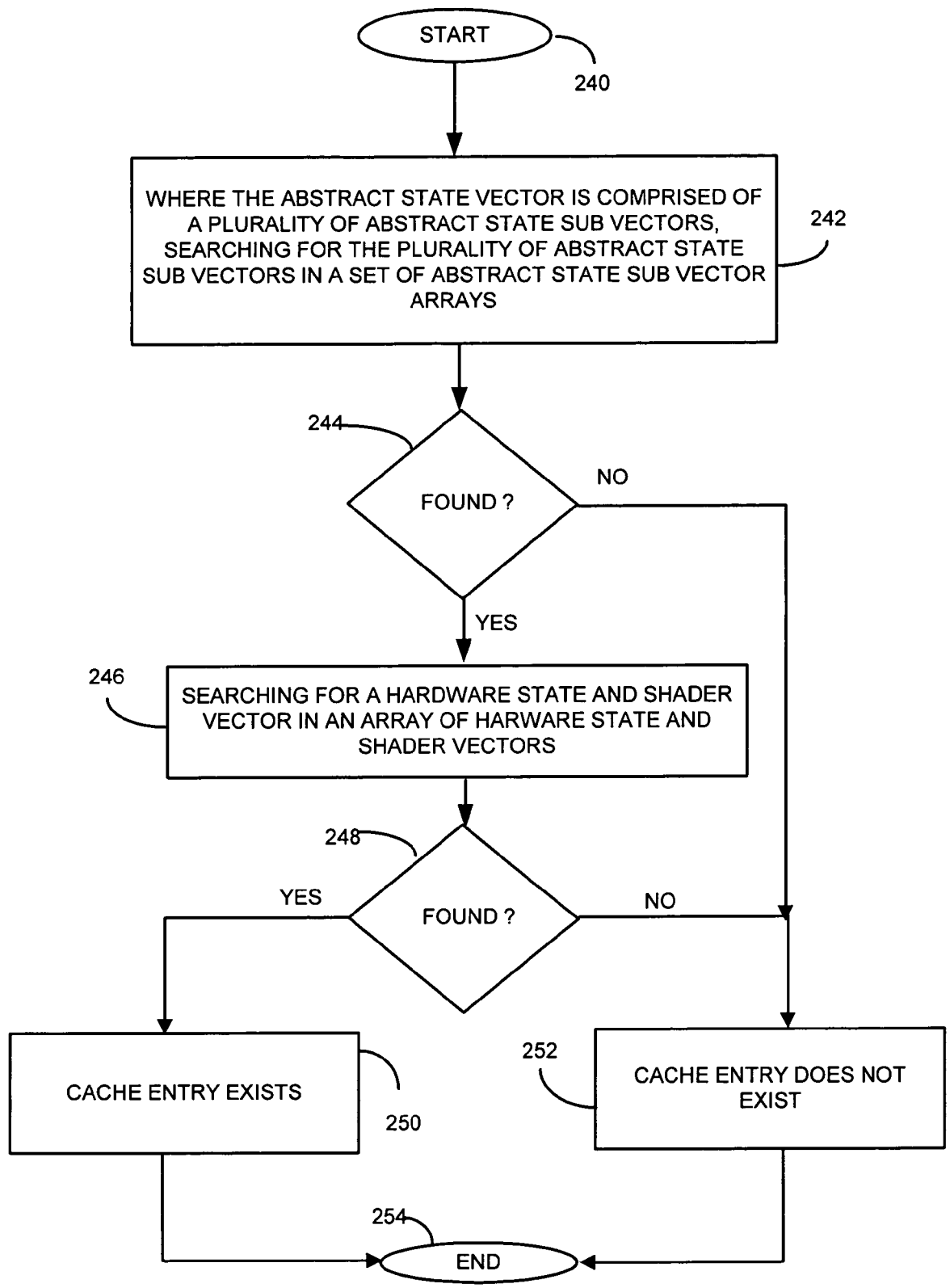
FIG. 6 is a flowchart illustrating the steps of determining if an abstract state vector is within the state and shader cache in accordance with one embodiment of the present invention.

FIG. 5 illustrates representation of an abstract state vector, shown generally at 230 which is composed of a plurality of abstract state sub-vectors, 232. Illustrated in FIG. 5, the abstract state vector 230 is composed of eight abstract sub-vectors 232, abstract state sub-vector A through abstract state sub-vector H is for illustration purposes only and is not herein so limiting. As recognized by one skilled in the art, the abstract state vector may be parsed into as many abstract state sub-vectors as required to efficiently determine whether a cache entry exists for the abstract state vector 230. Extracted from the abstract state sub-vectors 232 are a plurality of indices 234, which represent each of the abstract state sub-vectors 232.

Concurrent with the abstract state sub-vector index 234, an array of the abstract state sub-vectors 236, wherein the abstract state sub-vector data is stored therein, is created. Each abstract state sub-vector index 234, looks up the corresponding abstract state sub-vector data 236 in that array. An array of state and shader hardware vectors 238 is created and data is added to this array each time the compiler is run. The combination of all indices 234 is used to index or address the array of state and shader hardware vectors 238. The combination of the indices 234 to create an addressing key may be a concatenation of the indices, a hash function or other method apparent to one of ordinary skill in the art. Thereupon, an array of the state and shader vectors is created wherein it is addressed by composite index, specifically the index A through H, 234.

If all of the abstract state sub-vectors are found, the next step is searching for a composite index in an array of composite indices and hardware state and shader vectors, step 246. Designated at 248 if the composite index is found, it is determined that a cache entry exists, designated at 250. If an abstract state sub-vector is not found, step 244 or the composite index is not found in the array of composite indices 248, it is determined that a cache entry does not exist, step 252. Thereupon the state and shader cache can make a determination whether to send a miss signal to the compiler, step 254.

It should be understood that the implementation of other variations and modifications of the invention and its various aspects will be apparent to those of ordinary skill in the art, and that the invention is not limited by the specific embodiments described herein. For example, the state and shader cache may contain more information beyond the abstract state vector, the hardware state and shader vector for each individual cache entry, as may be used by the hardware connected to the state and shader cache. It is therefore contemplated to cover by the present invention, any and all modifications, variations, or equivalents that fall within the spirit and scope of the basic underlying principles disclosed and claimed herein.

What is claimed is:

1. A method for graphics processing comprising:
providing an abstract state vector to a state and shader cache;
determining if a cache entry exists within the state and shader cache for the abstract state vector wherein the cache entry contains a hardware state and shader vector; and
if the cache entry exists, providing the hardware state and shader vector within the cache entry to a graphics processor.

2. The method of claim 1 further comprising:
providing the abstract state vector to a compiler; and
if the cache entry does not exist compiling the abstract state vector to produce the hardware state and shader vector forte abstract state vector;
generating a cache entry for the abstract state vector;
writing the hardware state and shader vector to the state and shader cache; and
providing the hardware state and shader vector to a graphics processor.

3. The method of claim 2 wherein the abstract state vector is comprised of a vertex shader intermediate form, vertex shader constants, pixel shader intermediate form, pixel shader constants, and abstract render state.

4. The method of claim 2 wherein the cache entry within the state and shader cache is comprised of the abstract state vector and the hardware state and shader vector.

5. The method of claim 1 further comprising:
providing the abstract state vector to a compiler;
if the cache entry does not exist, providing a miss signal to the compiler.

6. The method of claim 5, further comprising:
in response to the miss signal: compiling the abstract state vector to produce the hardware state and shader vector for the abstract state vector;
generating the cache entry for the abstract state vector;
writing the hardware state and shader vector to the state and shader cache; and
providing the hardware state and shader vector to a graphics processor.

7. The method of claim 6 wherein the abstract state vector is comprised of a vertex shader intermediate form, vertex shader constants, pixel shader intermediate form, pixel shader constants, and abstract render state.

8. The method of claim 7 wherein the cache entry within the state and shader cache is comprised of the abstract state vector and the hardware state and shader vector.

9. The method of claim 1 wherein the abstract state vector is comprised of a plurality of abstract state sub vectors, the step of determining if a cache entry exists comprises:
searching for the plurality of abstract state sub vectors in a set of abstract state sub vector arrays; and
if the plurality of abstract state sub vectors are found within the abstract stare sub vector array, searching for a composite index in an array of composite indices and hardware state and shader vectors.

10. The method of claim 9 wherein if the composite index is found within the array of composite indices and hardware state and shader vectors, a cache entry exists.

11. The method of claim 9 wherein a cache entry does not exist where at least one of the following occurs: the plurality of abstract state sub vectors are not found in the set of abstract state sub vector arrays and the composite index is not found within the array of composite indices and hardware state and shader vectors.

12. A method for graphics processing comprising:
providing an abstract state vector to a stare and shader cache;
providing the abstract state vector to a compiler;
determining if a cache entry exists within the state and shader cache for the abstract state vector;
if the cache entry exists, providing hardware state and shader vector within the cache entry to a graphics processor; and
if the cache entry does not exist, compiling the abstract state vector to produce the hardware state and shader vector for the abstract state vector.

13. The method of claim 12 further comprising: after compiling the abstract state vector:
generating a cache entry within the state and shader cache; and
writing the hardware state and shader vector to the state and shader cache.

14. The method of claim 13 further comprising: providing the hardware state and shader vector to a graphics processor.

15. The method of claim 14 wherein the abstract state vector is comprised of a vertex shader intermediate form, vertex shader constants, pixel shader intermediate form, pixel shader constants, and abstract render state.

16. The method of claim 12 wherein the cache entry within the state and shader cache is comprised of the abstract state vector and the hardware state and shader vector.

17. A graphics processor comprising:
at least one state and shader cache;
a compiler operably coupled to the state and shader cache for compiling a hardware state and shader vector from an abstract state vector; and
an abstract state vector register containing the abstract state vector wherein the abstract state vector register is operably coupled to the state and shader cache and the compiler to provide the abstract state vector to the state and shader cache and the compiler.

18. The graphics processor of claim 17 wherein the abstract state vector register receives a plurality of input information comprising of vertex shader intermediate form, vertex shader constants, pixel shader intermediate form, pixel shader constants, and abstract render state.

19. The apparatus of claim 18 wherein the state and shader cache stores at least one abstract state vector and at least one hardware state and shader vector.

* * * * *